(12) United States Patent
Cao

(10) Patent No.: US 10,262,341 B2
(45) Date of Patent: Apr. 16, 2019

(54) RESOURCE DOWNLOADING METHOD AND DEVICE

(71) Applicant: ZTE CORPORATION, Shenzhen, Guangdong Province (CN)

(72) Inventor: Gang Cao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 212 days.

(21) Appl. No.: 15/317,122

(22) PCT Filed: Aug. 1, 2014

(86) PCT No.: PCT/CN2014/083594
§ 371 (c)(1),
(2) Date: Dec. 8, 2016

(87) PCT Pub. No.: WO2015/188431
PCT Pub. Date: Dec. 17, 2015

(65) Prior Publication Data
US 2017/0132669 A1    May 11, 2017

(30) Foreign Application Priority Data

Jun. 10, 2014   (CN) .......................... 2014 1 0255545

(51) Int. Cl.
*G06Q 30/00* (2012.01)
*G06Q 30/02* (2012.01)
(Continued)

(52) U.S. Cl.
CPC ......... *G06Q 30/0277* (2013.01); *G06F 17/30* (2013.01); *G06F 17/30867* (2013.01);
(Continued)

(58) Field of Classification Search
None
See application file for complete search history.

(56) References Cited

U.S. PATENT DOCUMENTS 8,413,046 B1    4/2013  Mocanu
8,869,025 B2 *  10/2014 Bao ........................ G06Q 30/02
                                                          705/14.73

(Continued)

FOREIGN PATENT DOCUMENTS

| CN | 102033881 A | 4/2011 |
| CN | 102270206 A | 12/2011 |
| CN | 103577427 A | 2/2014 |

OTHER PUBLICATIONS

Access Prevention Techniques for Internet Content Filtering, prepared for the National Office for the Information Economy; Paul Greenfield, Philip McCrea, Shuping Ran; Dec. 1999; XP-002265027.

(Continued)

*Primary Examiner* — Matthew T Sittner
(74) *Attorney, Agent, or Firm* — Ling Wu; Stephen Yang; Ling and Yang Intellectual Property

(57) ABSTRACT

The present invention discloses a resource downloading method and device. The above method includes: performing a dynamic detection on a DOM tree of a web page where resources to be downloaded are located, acquiring a plurality of URL resources; filtering out a part of URL resources corresponding to advertisement data from the plurality of URL resources; and prompting a user to download remaining URL resources after the advertisement data are filtered out. With the technical solution provided by the present invention, a user can acquire media files which the user is interested in from web pages that provide online playing only at will, thereby greatly improving user experience.

12 Claims, 6 Drawing Sheets

(51) Int. Cl.
*G06F 17/30* (2006.01)
*H04L 29/08* (2006.01)

(52) U.S. Cl.
CPC .............. *H04L 67/02* (2013.01); *H04L 67/06* (2013.01); *H04L 67/34* (2013.01)

(56) References Cited

U.S. PATENT DOCUMENTS

| | | | | |
|---|---|---|---|---|
| 9,317,694 | B2* | 4/2016 | Arbabi | G06F 21/577 |
| 2003/0110277 | A1* | 6/2003 | Cheng | H04L 29/06 |
| | | | | 709/231 |
| 2008/0134015 | A1* | 6/2008 | Milic-Frayling | G06F 17/30882 |
| | | | | 715/206 |
| 2011/0078558 | A1* | 3/2011 | Bao | G06Q 30/02 |
| | | | | 715/234 |
| 2013/0198364 | A1* | 8/2013 | Roberts | G06F 17/30861 |
| | | | | 709/224 |
| 2013/0204867 | A1* | 8/2013 | Lim | G06F 17/2745 |
| | | | | 707/723 |
| 2014/0068411 | A1* | 3/2014 | Ross | G06F 17/00 |
| | | | | 715/234 |
| 2014/0089786 | A1* | 3/2014 | Hashmi | G06F 17/2247 |
| | | | | 715/234 |
| 2014/0100963 | A1* | 4/2014 | Ruan | H04L 67/20 |
| | | | | 705/14.64 |
| 2014/0201113 | A1* | 7/2014 | Harz | H04L 67/02 |
| | | | | 706/12 |
| 2015/0127771 | A1* | 5/2015 | Bauer-Hermann | H04L 67/22 |
| | | | | 709/217 |
| 2015/0154402 | A1* | 6/2015 | Arbabi | G06F 21/577 |
| | | | | 726/25 |
| 2015/0169430 | A1* | 6/2015 | Deng | G06F 11/3676 |
| | | | | 717/124 |
| 2015/0206169 | A1* | 7/2015 | Ye | G06Q 30/0242 |
| | | | | 705/14.41 |
| 2016/0267278 | A1* | 9/2016 | Weng | G06F 21/554 |
| 2017/0132669 | A1* | 5/2017 | Cao | G06Q 30/0277 |

OTHER PUBLICATIONS

WikiU2013: "URL Snooper", Wikipedia, May 19, 2014(May 19, 2014); XP 002769024, Retrieved from the Internet: URL: https://en.wikipedia.org/w/index.php?title=URL_Snooper&oldid=609278426 [retrieved on Apr. 3, 2017].

ChrisGualtieri: "Stream recorder", Wikipedia, Oct. 24, 2013(Oct. 24, 2013), XP 002769025, Retrieved from the Internet: URL: https://en.wikipedia.org/w/index.php?title=Stream_recorder&oldid=578481946[retrieved on Apr. 3, 2017].

* cited by examiner

RESOURCE DOWNLOADING METHOD AND DEVICE

TECHNICAL FIELD

The present document relates to the field of communication, and in particular to a resource downloading method and device.

BACKGROUND

With the rapid development of the wireless communication technology and Internet technology, more and more users use the browser on the mobile terminal to surf the Internet. As an entrance of the mobile Internet, the importance of the browser is self-evident. How to improve the user experience of the browser on the mobile terminal and then to make the highlights in the intensified market competition and occupy the market share has become the research emphasis in the current browser technology.

In general conditions, when the user utilizes the browser on a mobile terminal to browse some video and music sites, the user finds that his favorite video or music in the web pages can only be played online, and there is no any operation button for downloading the multimedia file, thus it is unable to download these files into the local for playing smoothly at any time. While repeated online playing not only consumes the network traffic, but also often has jam and stutter phenomenon occurred in the play process due to influence of the network bandwidth, and then the user experience is reduced. Based on the above existing problem, a browser technology known as "sniffing" is born at the right moment. Its main principle is to detect each tag in the web page after the web page resources are completely loaded; if the video or audio tags, etc., then it is to acquire uniform resource locators (URL) corresponding to the video or audio tags, and then prompt the user whether they are required to be downloaded after the URL verification. Through the user selecting, the URL corresponding to the prompt downloading option, the multimedia files can be downloaded to the local for playing. However, the following defects still exist in the above conventional sniffing method:

(1) this is a static detection method, however, after the web page is loaded completely, its media content often has some dynamical changes, therefore, the conventional sniffing often has the situation of a missed detection or a false detection.

(2) a lot of web pages will play a section of content in advance, such as, an advertisement video, etc., which is not relevant to the user requirement in the opening process, while the conventional sniffing often sniffs these advertisements out and sends to the user to download, but it cannot sniff the media files which are required originally by the user.

(3) the downloaded file name is often unable to know in the sniffing stage, the conventional method can only name it by using an ending string of a corresponding URL, and the user is often uncertain which is the file downloaded by himself after the downloading.

SUMMARY

The present document provides a resource downloading method and device, to at least solve the problem how to sniff the media files by using the browser so as to provide the local downloading to the user in the situation that the media files of the web site, such as, video or music files, etc., are only provided with online playing while without supporting the local downloading in the existing technology.

According to one aspect of the present document, a resource downloading method is provided.

A resource downloading method according to an embodiment of the present document includes: performing a dynamic detection on a document object model, DOM, tree of a web page where resources to be downloaded are located, acquiring a plurality of uniform resource locator, URL, resources; filtering out a part of URL resources corresponding to advertisement data from the plurality of URL resources; and prompting a user to download remaining URL resources after the advertisement data are filtered out.

Alternatively, performing a real-time detection on a DOM tree, acquiring a plurality of URL resources includes: judging whether a tag in a preset tag set exists in the DOM tree, herein, the preset tag set includes at least one of the following: a video tag, an audio tag, an object tag; if the tag in the preset tag set exists in the DOM tree, acquiring a hypertext reference, href, attribute corresponding to the tag, and extracting the plurality of URL resources from the href attribute.

Alternatively, filtering out a part of URL resources from the a plurality of URL resources includes: receiving latest updated advertisement intercepting data information from a server, herein, the advertisement intercepting data information includes: identification information of the part of URL resources and characteristic information of determining the part of URL resources as advertisement data to be intercepted; and filtering out the part of URL resources from the plurality of URL resources by using the advertisement intercepting data information.

Alternatively, prompting a user to download remaining URL resources includes: naming the remaining URL resources; and displaying file names of the remaining URL resources according to a preset display mode.

Alternatively, naming the remaining URL resources includes: setting a title of a web page where each URL resource in the remaining URL resources is located as a first file name; setting last N bit characters of each URL resource as a second file name, herein, N is a positive integer; and combining the first file name and the second file name, and naming each URL resource.

Alternatively, performing a dynamic detection on a DOM tree includes one of the following: performing a detection on the DOM tree according to a preset period; performing a detection on the DOM tree triggered automatically by a web page background script; and performing a detection on the DOM tree triggered after a web page sub-resource loading event caused by the user clicking a preset button is captured.

Alternatively, before prompting the user to download the remaining URL resources, the method further includes: performing URL verification on the remaining URL resources by using a preset URL specification.

A resource downloading device is provided according to another aspect of the present document.

The resource downloading device according to an embodiment of the present document includes: a detection module, arranged to perform a dynamic detection on a document object model, DOM, tree of a web page where resources to be downloaded are located, acquire a plurality of uniform resource locator, URL, resources; a filtering module, arranged to filter out a part of URL resources corresponding to advertisement data from the a plurality of URL resources; and a processing module, arranged to prompt a user to download remaining URL resources after the advertisement data are filtered out.

Alternatively, the detection module includes: a judgment unit, arranged to judge whether a tag in a preset tag set exists in the DOM tree, herein, the preset tag set includes at least one of the following: a video tag, an audio tag and an object tag; and an extraction unit, arranged to: acquire a hypertext reference, href, attribute corresponding to the tag and extract the plurality of URL resources from the href attribute when the judgment unit outputs yes.

Alternatively, the filtering module includes: a receiving unit, arranged to: receive latest updated advertisement intercepting data information from a server, herein, the advertisement intercepting data information includes: identification information of the part of URL resources and characteristic information of determining the part of URL resources as advertisement data to be intercepted; and a filtering unit, arranged to filter out the part of URL resources from the plurality of URL resources by using the advertisement intercepting data information.

Alternatively, the processing module includes: a naming unit, arranged to: name the remaining URL resources; and a displaying unit, arranged to: display file names of the remaining URL resources according to a preset display mode.

Alternatively, the naming module includes: a first setting subunit, arranged to set a title of a web page where each URL resource in the remaining URL resources is located as a first file name; a second setting subunit, arranged to set last N bit characters of each URL resource as a second file name, herein, N is a positive integer; and a combination subunit, arranged to combine the first file name and the second file name, and name each URL resource.

Alternatively, the detection module is arranged to perform the dynamic detection on the DOM tree according to one of the following modes: performing a detection on the DOM tree according to a preset period; performing a detection on the DOM tree triggered automatically by a web page background script; and performing a detection on the DOM tree triggered after a web page sub-resource loading event caused by the user clicking a preset button is captured.

Alternatively, the above device further includes: a verification module, arranged to perform URL verification on the remaining URL resources by using a preset URL specification.

By adopting the embodiment of the present document, it performs a dynamic detection on a DOM tree of a web page where resources to be downloaded are located, acquires a plurality of URL) resources; filters out a part of URL resources corresponding to advertisement data from the plurality of URL resources; and prompts a user to download remaining URL resources after the advertisement data are filtered out; which solves the problem how to sniff the media files by using the browser so as to provide the local downloading to the user in the situation that the media files of the web site, such as, video or music, etc., are only provided with online playing while without supporting the local downloading in the existing technology, and further, enables the user to acquire at will media files which the user is interested in from web pages that provide online playing only, and thereby greatly improves user experience.

BRIEF DESCRIPTION OF DRAWINGS

The accompanying drawings described herein are used to provide further understanding for the present document and constitute a part of the present application. The illustrated embodiments of the present document and the description thereof are used to explain the present document, rather than constituting an inappropriate limitation to the present document. In accompanying drawings.

SPECIFIC EMBODIMENTS

The present document is described in detail with reference to the accompanying drawings and in combination with embodiments hereinafter. It should be illustrated that, in the case of not conflicting, the embodiments in the present application and features in these embodiments can be combined with each other.

Figure 1:
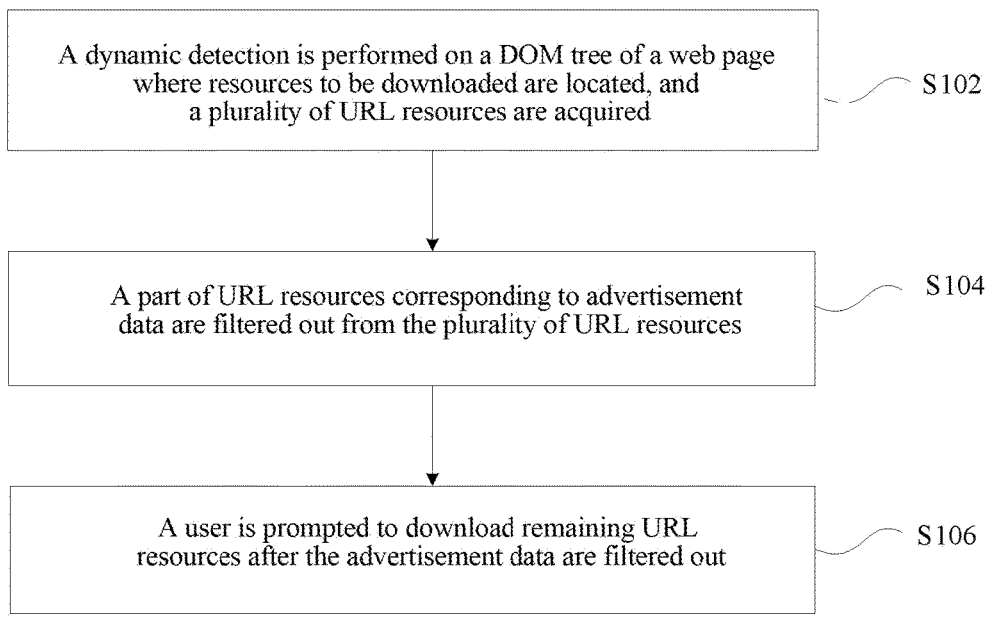
FIG. 1 is a flow chart of a resource downloading method according to an embodiment of the present document.

FIG. 1 is a flow chart of a resource downloading method according to an embodiment of the present document. As shown in FIG. 1, the method can include the following processing steps.

In step S102: it is to perform a dynamic detection on a document object model (DOM) tree of a web page where resources to be downloaded, and acquire a plurality of uniform resource locator (URL) resources.

In step S104: it is to filter out URL resources corresponding to advertisement data from the plurality of URL resources.

In step S106: it is to prompt a user to download remaining URL resources after the advertisement data are filtered out.

In existing technology, in the situation that the media files of the web sites, such as, video or music, etc., only provide the online playing while without supporting the local downloading, it is lack of accuracy and flexibility to use the mode that the existing browser sniffs the media files to provide the user with local downloading. By adopting the method as shown in FIG. 1, a plurality of URL resources are acquired through performing a dynamic detection on the DOM tree of the web page where the resources to be downloaded are located, which can avoid the missed detection or fault detection in the existing browser sniffing technology, severe disruption of the advertisement media files can be avoided through filtering out a part of URL resources corresponding to the advertisement data from the plurality of URL resources, and then the user is prompted to download the remaining URL resources after the advertisement data are filtered out, therefore it solves the problem how to sniff the media files by using the browser so as to provide the local downloading to the user in the situation that the media files of the web site, such as, video or music, etc., are only provided with online playing while without supporting the local downloading in existing technology, and further, enables the user to acquire media files which the user is interested in from web pages that provide online playing only at will, and thereby greatly improving user experience.

Alternatively, in step S102, performing a real-time detection on the DOM tree, and acquiring the plurality of URL resources includes the following operations.

In step S1: it is judged whether a tag in a preset tag set exists in the DOM tree, herein, the preset tag set includes at least one of the following: a video tag, an audio tag, an object tag;

In step S2: if yes, then a hypertext reference (href) attribute corresponding to the tag is acquired, and the plurality of URL resources are extracted from the href attribute.

In an alternative implementation process, performing a dynamic detection on the DOM tree can include one of the following modes:

a first mode: performing a detection on the DOM tree according to a preset period;

a second mode: performing a detection on the DOM tree triggered automatically by a web page background script; and a third mode: performing a detection on the DOM tree triggered after a web page sub-resource loading event, caused by the user clicking a preset button, is captured.

Figure 2:
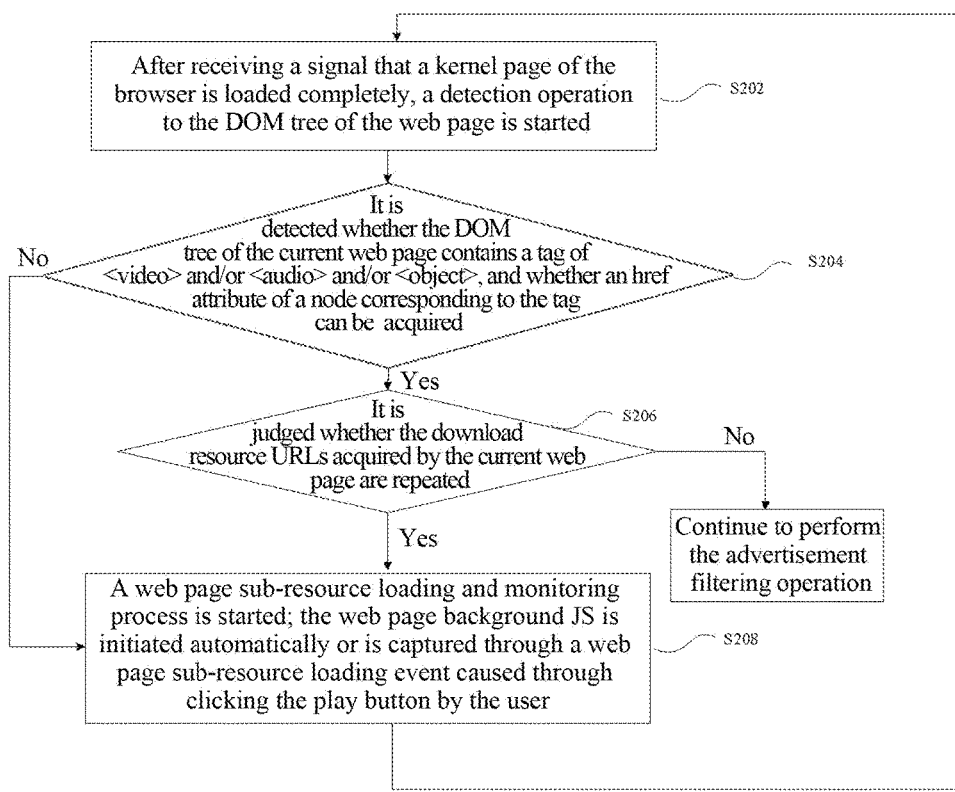
FIG. 2 is a flow chart of a method of performing a dynamic detection on media resources of the web page according to an alternative embodiment of the present document.

As an alternative embodiment of the present document, FIG. 2 is a flow chart of a method of performing a dynamic detection on media resources of the web page according to an alternative embodiment of the present document. As shown in FIG. 2, the procedure can include the following processing steps.

In step S202: after receiving a signal that a kernel page of the browser is loaded completely, a detection operation to the DOM tree of the web page is started.

In step S204: when it is detected that the DOM tree of the current web page contains a tag of <video> and/or <audio> and/or <object>, the Hypertext Reference (referred to as href) attribute of a node corresponding to the tag is acquired, that is, the download URL resources of the audio or video files, and then it continues to execute step S206; otherwise, it forwards to step S208.

In step S206: it is judged whether the download resource URLs acquired by the current web page are repeated; if not repeated, then the method can continue the operation of filtering out the advertisement, and the stage is ended; if repeated, then it forwards to step S208.

In step S208: a web page sub-resource loading and monitoring process is started; after the web page background JavaScript is initiated automatically or a web page sub-resource loading event caused through clicking the play button by the user is captured, the step S202 is executed again for detection.

Through the above dynamic monitoring and detection, the changes of internal nodes of the DOM tree can be monitored in real time, so as to avoid the occurrence of the missed detection of the sniffing.

Alternatively, in step S104, filtering out a part of URL resources from a plurality of URL resources can include the following steps.

In step S3: latest updated advertisement intercepting data information is received from a server, herein, the advertisement intercepting data information can include but not limited to: identification information of the part of URL resources (e.g.: website host name (HostName) information) and characteristic information of determining the part of URL resources as advertisement data to be intercepted (e.g.: keyword information of the advertising data corresponding to the HostName information);

In step S4: the part of URL resources are filtered out from the plurality of URL resources by using the advertisement intercepting data information.

Figure 3:
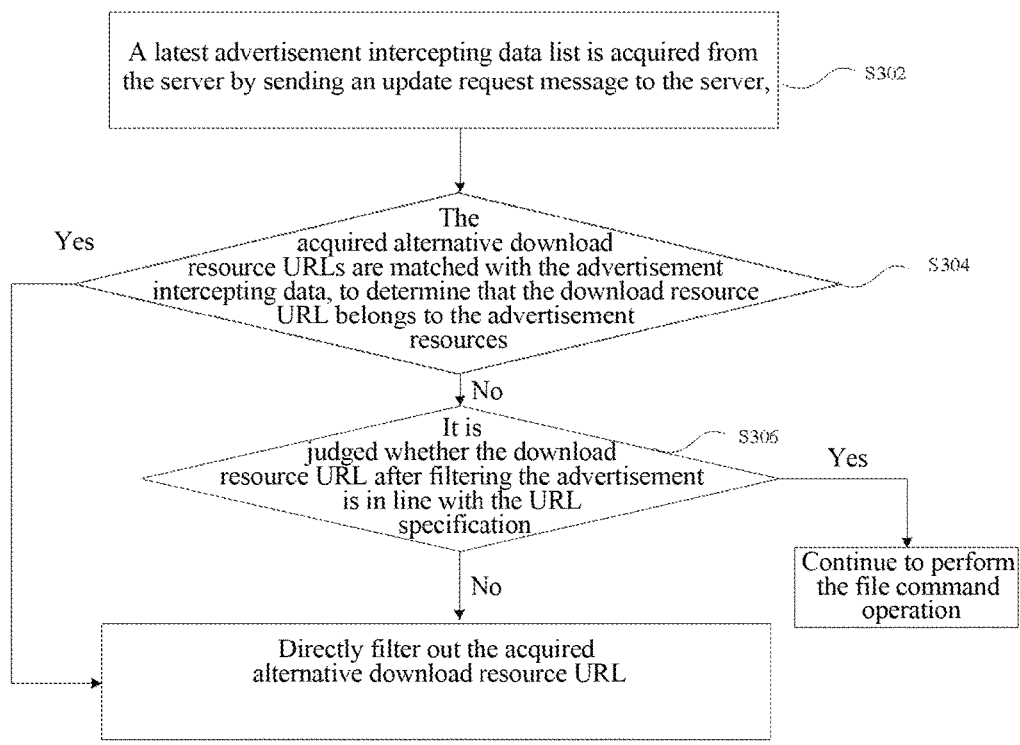
FIG. 3 is a flow chart of a method for performing advertisement filtering and verification to sniffed resources of the web page according to an alternative embodiment of the present document.

As another alternative embodiment of the present document, FIG. 3 is a flow chart of a method for performing advertisement filtering and verification on sniffed resources of the web page according to an alternative embodiment of the present document. As shown in FIG. 3, the procedure can include the following processing steps.

In step S302: by sending an update request message to the server, a latest advertisement intercepting data list is acquired from the server, and the advertisement intercepting data list can include two fields: one is the web site host name (HostName) of some current popular video and/or audio websites, and the other is the keyword (key) included in the URL corresponding to the advertisement played by the website, herein, the HostName in uniform in the advertisement intercepting data list, and one HostName can correspond to a plurality of keys.

In step S304: the acquired alternative download resource URLs are matched with the advertisement intercepting data. In the alternative embodiment, the HostName can be obtained from its own URL of the current web page; And then it is searched whether there is a key corresponding to the HostName in the advertisement data list; finally, it is checked whether those keys are included in the alternative download resource URL; if yes, then it is illustrated that the download resource URL belongs to the advertisement resources and will be filtered out directly; otherwise, step S306 is continued to be executed.

In step S306: it is judged whether the download resource URL after filtering the advertisement is in line with the URL specification; if not, then it is directly filtered; and if yes, then the subsequent procedure of naming the download files is continued to be executed.

Alternatively, in step S106, prompting the user to download the remaining URL resources can include the following operations.

In step S5: the remaining URL resources are named.

In step S6: the file names of the remaining URL resources are displayed according to a preset display mode.

Alternatively, in step S5, naming the remaining URL resources can include the following steps.

In step S51: a title of a web page where each URL resource in the remaining URL resources is located is set as a first file name.

In step S52: last N bit characters of the each URL resource are set as a second file name, herein, N is a positive integer.

In step S53: the first file name and the second file name are combined, and the each URL resource is named.

Figure 4:
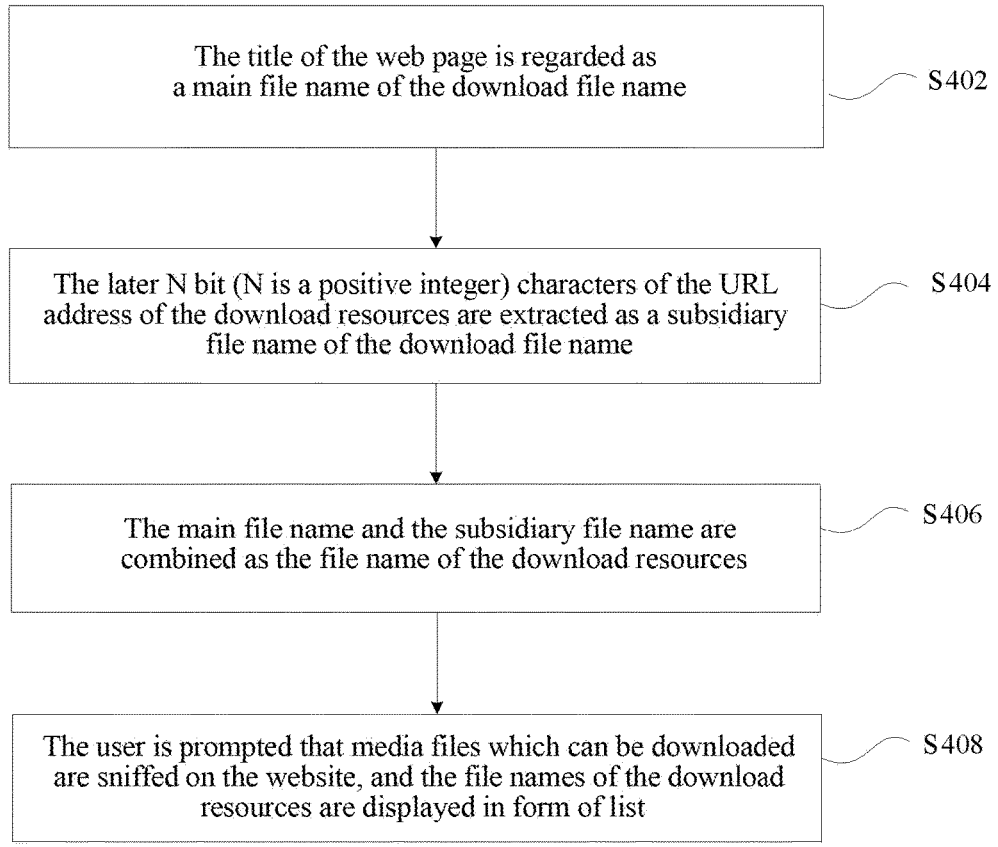
FIG. 4 is a flow chart of a method for naming and prompting sniffed downloading files of the web page according to an alternative embodiment of the present document.

As another alternative embodiment of the present document, FIG. 4 is a flow chart of a method for naming and prompting sniffed downloading files of the web page according to an alternative embodiment of the present document. As shown in FIG. 4, the procedure can include the following processing steps.

In step S402: the title of the web page is regarded as a main file name of the download file name; and in general, the title of the web page can include more accurate information in the download file.

In step S404: the later N bit (N is a positive integer) characters of the URL address of the download resources are extracted as a subsidiary file name of the download file name, for example: generally the later 8 bits are extracted, which mainly considers to retain the file type suffix as much as possible.

In step S406: the main file name and the subsidiary file name are combined as the file name of the download resources.

In step S408: the user is prompted that media files which can be downloaded are sniffed on the website, and the file names of the download resources are displayed by means of list.

Alternatively, in step S106, before prompting the user to download the remaining URL resources, it can further include the following operations.

In step S9: URL verification is performed on the remaining URL resources by using a preset URL specification. That is, it is required to verify the URL download resources after filtering out the advertisement, to judge whether they meet the URL specification. While, in general, only after the URL download resources after filtering out the advertisement meet the URL specification, the user is just prompted that media files which can be downloaded are sniffed on the web site, and the file names of the download resources are displayed by means of list, so as to be downloaded by the user.

Figure 5:
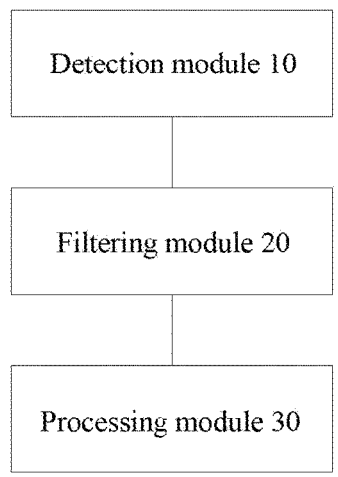
FIG. 5 is a structure block diagram of a resource downloading device according to an embodiment of the present document.

FIG. 5 is a structure block diagram of a resource downloading device according to an embodiment of the present document. As shown in FIG. 5, the resource downloading device can include: a detection module 10, arranged to perform a dynamic detection a document object model (DOM) tree of a web page where resources to be downloaded are located, acquire a plurality of uniform resource locator (URL) resources; a filtering module 20, arranged to filter out a part of URL resources corresponding to advertisement data from the a plurality of URL resources; and a processing module 30, arranged to prompt a user to download remaining URL resources after the advertisement data are filtered out.

By adopting the device as shown in FIG. 5, it solves the problem that how to sniff the media files by using the browser so as to provide the local downloading to the user, in the situation that the media files of the web site, such as, video or music, etc., are only provided with online playing while without supporting the local downloading in the existing technology, and further, enables the user to acquire at will media files which the user is interested in from web pages that provide online playing only, and thereby greatly improving user experience.

Figure 6:
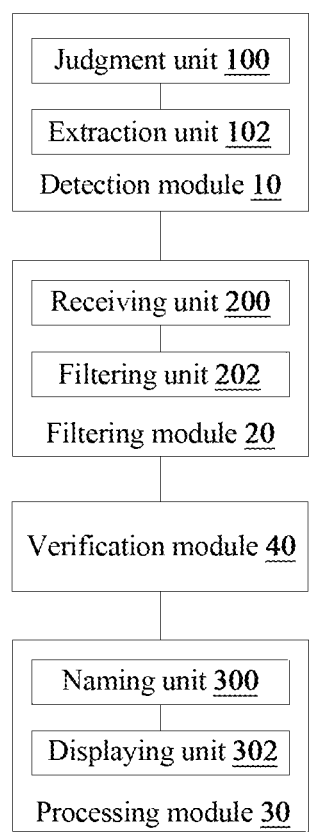
FIG. 6 is a structure block diagram of a resource downloading device according to an alternative embodiment of the present document.

Alternatively, as shown in FIG. 6, the detection module 10 can include: a judgment unit 100, arranged to judge whether a tag in a preset tag set exists in the DOM tree, herein, the preset tag set includes at least one of the following: a video tag, an audio tag and an object tag; and an extraction unit 102, arranged to: acquire a hypertext reference (href) attribute corresponding to the tag and extract the a plurality of URL resources from the href attribute when the judgment unit outputs yes.

Alternatively, as shown in FIG. 6, the filtering module 20 can include: a receiving unit 200 arranged to receive latest updated advertisement intercepting data information from a server and a filtering unit 202 arranged to filter out the part of URL resources from the plurality of URL resources by using the advertisement intercepting data information. Herein, herein, the advertisement intercepting data information includes: identification information of the part of URL resources and characteristic information of determining the part of URL resources as advertisement data to be intercepted.

Alternatively, as shown in FIG. 6, the processing module 30 can include: a naming unit 300, arranged to: name the remaining URL resources; and a displaying unit 302, arranged to: display file names of the remaining URL resources according to a preset display mode.

Alternatively, the naming module 300 can include: a first setting subunit (not shown in the figure), arranged to set a title of a web page where each URL resource in the remaining URL resources is located as a first file name; a second setting subunit (not shown in the figure), arranged to set last N bit characters of the each URL resource as a second file name, herein, N is a positive integer; and a combination subunit (not shown in the figure), arranged to combine the first file name and the second file name, and name the each URL resource.

Alternatively, the detection module 10 is arranged to perform a dynamic detection on the DOM tree according to one of the following modes: performing a detection on the DOM tree according to a preset period; perform a detection on the DOM tree triggered automatically by a web page background script; and perform a detection on the DOM tree triggered after a web page sub-resource loading event, caused by the user clicking a preset button, is captured.

Alternatively, as shown in FIG. 6, the above device further can include: a verification module 40, arranged to perform URL verification to the remaining URL resources by using a preset URL specification.

Figure 7:
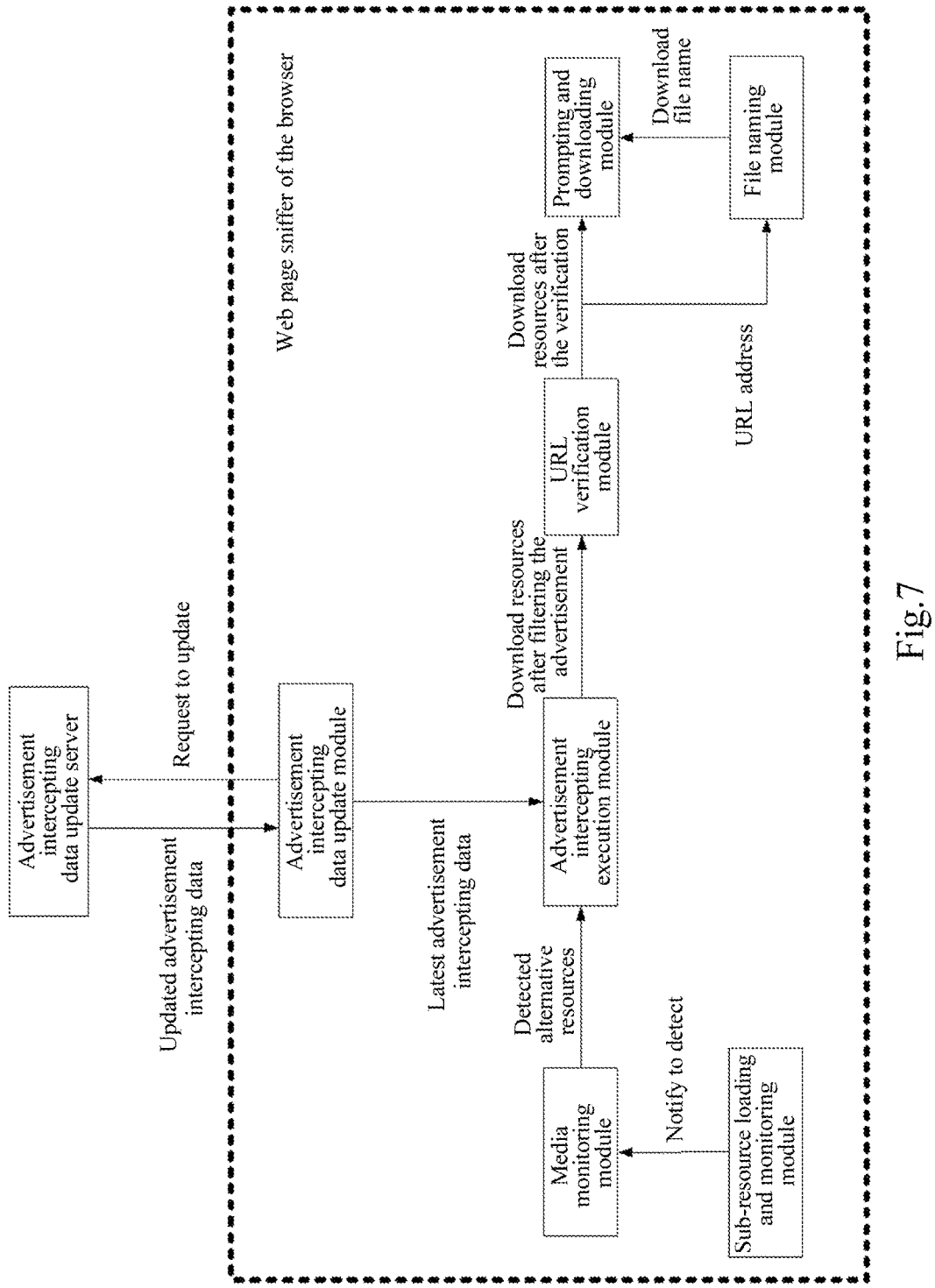
FIG. 7 is an overall architecture diagram of dynamically sniffing by a browser which can filter advertisement according to an alternative embodiment of the present document.

The above alternative implementation process is further described by combining with the alternative embodiment as shown in FIG. 7.

FIG. 7 is an overall architecture diagram of dynamically sniffing by a browser which can filter advertisement according to an alternative embodiment of the present document. As shown in FIG. 7, the above overall architecture can include: a media detection module (equivalent to the above detection module), a sub-resource loading and monitoring module, an advertisement intercepting data update module, an advertisement intercepting execution module (equivalent to the above filtering module), a URL verification module (equivalent to the above verification module), a file naming module (equivalent to the above naming unit), a prompting and downloading module (equivalent to part functions of the above processing module). The function realized by each module is as follows:

(1) the media detection module is mainly responsible for sniffing a node of a relevant media tag from a current document object model (referred to as DOM) in the web page, and acquiring a corresponding URL which can be downloaded from the node.

(2) the sub-resource loading and monitoring module is mainly responsible for monitoring whether there is a sub-resource to be loaded in a whole life cycle of the web page file, in order to facilitate notifying the media detection module to initiate the re-detection, and thus being able to dynamically sniff the download resources.

(3) the advertisement intercepting data update module is mainly responsible for sending the data update request to the server periodically, in order to obtain the latest advertisement intercepting information, herein, the latest advertisement intercepting information can include: a keyword of the advertisement URL resource on some current mainstream audio and/or video sites.

(4) the advertisement intercepting execution module is mainly responsible for detecting the URL acquired by the media detection module through the advertisement intercepting information updated by the server, to judge whether it is included in the black list (which is matched with the keyword of the advertisement intercepting information), and thus deleting and intercepting the URL contained in the blacklist.

(5) the URL verification module is mainly responsible for verifying the URL download resources after filtering out the advertisement, to judge whether they meet the URL specification.

(6) the file naming module is mainly responsible for acquiring the title information and URL address of the current web page so as to construct the name of the download file.

(7) the prompting and downloading module is mainly responsible for displaying the sniffed download resource information to the user, and performing the download management after the user selects to download it.

From the above description, it can be seen that the above embodiments achieve the following technical effects (it needs to be explained that these effects are the effects that some of the preferable embodiments can achieve): the technical scheme provided by the embodiment of the present document can effectively solve the problems, for example, the missed detection and fault detection in the existing browser sniffing technology, especially the serious interference of the advertisement media files, and the download file naming mode adopted currently which makes the user to be unable to distinguish which download file is the file required by the user itself, and then enable the user to acquire 1 media files which the user is interested in from web pages that provide online playing only at will, and thereby greatly improve the user experience.

Obviously, it can be understood by those skilled in the art that each module or each step above-mentioned in the present document can be implemented by the universal calculating device, and they can be integrated in a single computing device, or distributed in the network made up by a plurality of computing device. Alternatively, they can be implemented by the executable program codes of the computing device. Accordingly, they can be stored in the storage device and implemented by the computing device, and in some situation, the shown or described steps can be executed according to a sequence different from this place, or they are made to each integrated circuit module respectively, or a plurality of modules or steps therein are made into the single integrated circuit module to be implemented. This way, the present document is not limit to any specific form of the combination of the hardware and software.

The above description is only the alternative embodiments of the present document and is not intended to limit the present document. For those skilled in the art, the present document can have various modifications and variations. All of modifications, equivalents and/or variations without departing from the spirit and essence of the present document should be embodied in the scope of the appending claims of the present document.

INDUSTRIAL APPLICABILITY

As mentioned above, the resource downloading method and device provided by the embodiment of the present document have the following beneficial effects: it can effectively solve the problems, for example, the missed detection and fault detection in the existing browser sniffing technology, especially the serious interference of the advertisement media files, and the download file naming mode adopted currently which makes the user to be unable to distinguish which download file is the file required by the user itself, and then enable the user to acquire media files which the user is interested in from web pages that provide online playing only at will, and thereby greatly improve the user experience.

What is claimed is:

1. A resource downloading method, comprising following steps implemented by a processor of a resource downloading device:

performing a dynamic detection on a document object model, DOM, tree of a web page where resources to be downloaded are located, acquiring a plurality of uniform resource locator, URL, resources;

filtering out a part of URL resources corresponding to advertisement data from the plurality of URL resources; and prompting a user to download remaining URL resources after the advertisement data are filtered out, wherein filtering out a part of URL resources from the plurality of URL resources comprises:

receiving latest updated advertisement intercepting data information from a server, wherein, the advertisement intercepting data information comprises: identification information of the part of URL resources and characteristic information of determining the part of URL resources as advertisement data to be intercepted; and filtering out the partial URL resources from the plurality of URL resources by using the advertisement intercepting data information.

2. The method according to claim 1, wherein, perform a real-time detection on a DOM tree, acquiring a plurality of URL resources comprises:

judging whether a tag in a preset tag set exists in the DOM tree, wherein, the preset tag set comprises at least one of the following: a video tag, an audio tag and an object tag; and if the tag in the preset tag set exists in the DOM tree, then acquiring a hypertext reference, href, attribute corresponding to the tag, and extracting the plurality of URL resources from the href attribute.

3. The method according to claim 1, wherein, prompting a user to download remaining URL resources comprises:

naming the remaining URL resources; and displaying file names of the remaining URL resources according to a preset display mode.

4. The method according to claim 3, wherein, naming the remaining URL resources comprises:

setting a title of a web page where each URL resource in the remaining URL resources is located as a first file name;

setting last N bit characters of each URL resource as a second file name, wherein, N is a positive integer; and combining the first file name and the second file name, and naming each URL resource.

5. The method according to claim 1, wherein, performing a dynamic detection on a DOM tree, acquiring a plurality of URL resources comprises one of the following:

performing a detection on the DOM tree according to a preset period;

performing a detection on the DOM tree triggered automatically by a web page background script; and performing a detection on the DOM tree triggered after a web page sub-resource loading event caused by the user clicking a preset button is captured.

6. The method according to claim 1, before prompting the user to download the remaining URL resources, further comprising:

performing URL verification on the remaining URL resources by using a preset URL specification.

7. A resource downloading device, comprising a first processor and a first storage device, wherein the first storage device stores first processor-executable programs, and the first processor-executable programs comprise:

a detection module, arranged to perform a dynamic detection on a document object model, DOM, tree of a web page where resources to be downloaded are located, acquire a plurality of uniform resource locator, URL, resources;

a filtering module, arranged to filter out a part of URL resources corresponding to advertisement data from the a plurality of URL resources; and a processing module, arranged to prompt a user to download remaining URL resources after the advertisement data are filtered out, wherein, the filtering module comprises a second processor and a second storage device, wherein the second storage device stores second processor-executable programs, and the second processor-executable programs comprise:

a receiving unit, arranged to: receive latest updated advertisement intercepting data information from a server, wherein, the advertisement intercepting data information comprises: identification information of the partial URL resources and characteristic information of determining the part of URL resources as advertisement data to be intercepted; and a filtering unit, arranged to: filter out the partial URL resources from the a plurality of URL resources by using the advertisement intercepting data information.

8. The device according to claim 7, wherein, the detection module comprises a third processor and a third storage device, wherein the third storage device stores third processor-executable programs, and the third processor-executable programs comprise:

a judgment unit, arranged to judge whether a tag in a preset tag set exists in the DOM tree, wherein, the preset tag set comprises at least one of the following: a video tag, an audio tag and an object tag; and an extraction unit, arranged to: acquire a hypertext reference, href, attribute corresponding to the tag and extract the plurality of URL resources from the href attribute when the judgment unit outputs yes.

9. The device according to claim 7, wherein, the processing module comprises a fourth processor and a fourth storage device, wherein the fourth storage device stores first processor-executable programs, and the fourth processor-executable programs comprise:

a naming unit, arranged to: name the remaining URL resources; and a displaying unit, arranged to: display file names of the remaining URL resources according to a preset display mode.

10. The device according to claim 9, wherein, the naming unit comprises a fifth processor and a fifth storage device, wherein the fifth storage device stores first processor-executable programs, and the fifth processor-executable programs comprise:

a first setting subunit, arranged to set a title of a web page where each URL resource in the remaining URL resources is located as a first file name;

a second setting subunit, arranged to set last N bit characters of each URL resource as a second file name, wherein, N is a positive integer; and a combination subunit, arranged to combine the first file name and the second file name, and name each URL resource.

11. The device according to claim 7, wherein, the detection module is arranged to perform the dynamic detection on the DOM tree according to one of the following modes:

performing a detection on the DOM tree according to a preset period;

performing a detection on the DOM tree triggered automatically by a web page background script; and performing a detection on the DOM tree triggered after a web page sub-resource loading event caused by the user clicking a preset button is captured.

12. The device according to claim 7, the first processor-executable programs further comprise:

a verification module, arranged to perform URL verification to the remaining URL resources by using a preset URL specification.

* * * * *